Dec. 8, 1936.    A. G. F. WALLGREN    2,063,570
BEARING
Filed May 11, 1934

INVENTOR
August Gunnar Ferdinand Wallgren
BY
ATTORNEY

Patented Dec. 8, 1936

2,063,570

UNITED STATES PATENT OFFICE 2,063,570

BEARING

August Gunnar Ferdinand Wallgren, Stockholm, Sweden, assignor to Aktiebolaget Nomy, Stockholm, Sweden, a corporation of Sweden Application May 11, 1934, Serial No. 725,025
In Sweden May 22, 1933

16 Claims. (Cl. 308—73)

My invention relates to bearings and particularly to bearings of the type employing bearing blocks tiltably mounted so as to provide for the formation and retention of wedge-shaped films of lubricant between the bearing surfaces. Still more particularly, my invention relates to a bearing of this type adapted for supporting a shaft or the like subjected to a load which always acts in substantially the same direction.

Under this condition of load it is necessary to provide cooperating bearing surfaces only on one side of the bearing. This reduces the cost of the bearing, as well as reducing its weight and the friction developed thereby, all of which are objects of my invention.

A further object of my invention is to provide means for lubricating a bearing of this particular type. Still another object is to construct a bearing of this type which will permit a limited axial displacement of the shaft, while still being capable of sustaining thrust load.

Figure 1:
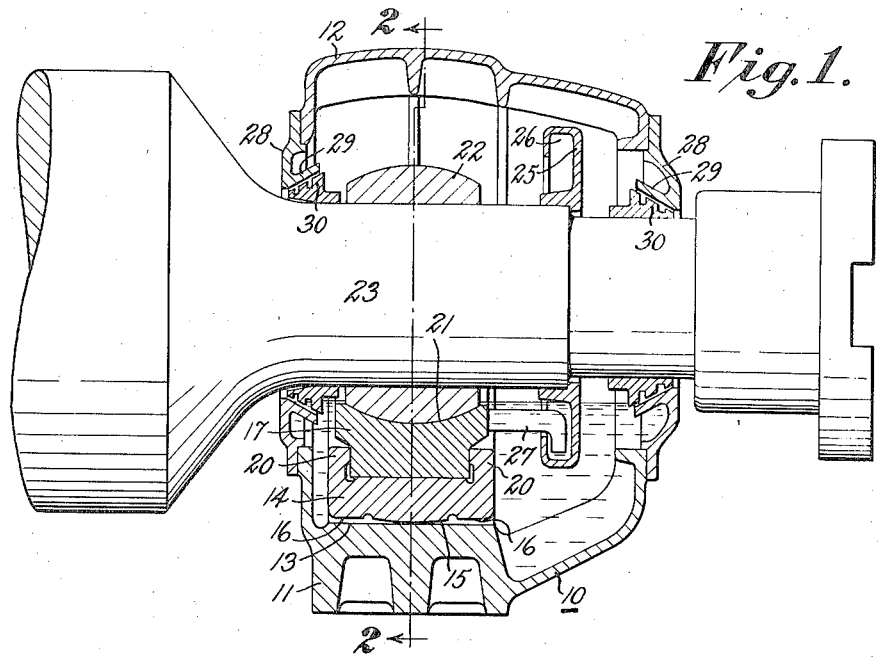
Figure 2:
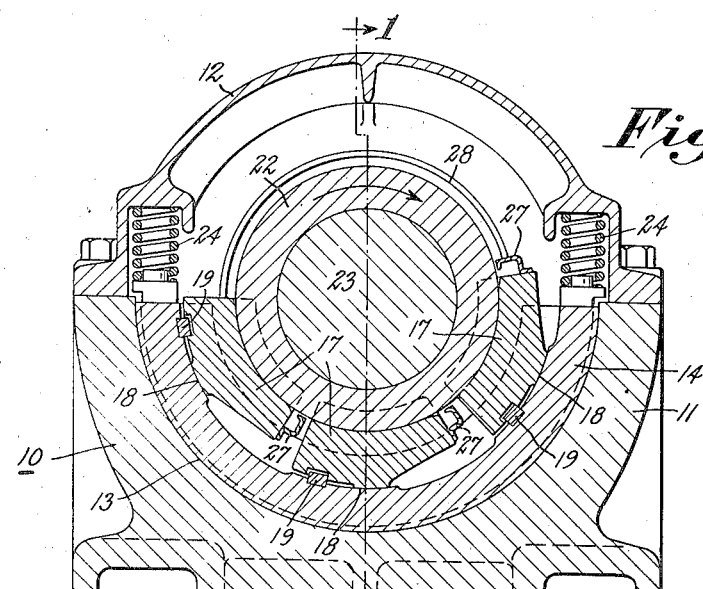

Further objects and advantages of my invention will be apparent from the following description considered in connection with the accompanying drawing, which forms a part of the specification, and of which:

Fig. 1 is a cross-sectional view of a preferred embodiment of my invention, taken on the line 1—1 of Fig. 2; and Fig. 2 is a cross-sectional view taken on the line 2—2 of Fig. 1.

Referring to the drawing, reference character 10 designates generally a bearing housing. Housing 10 comprises a lower portion 11 of heavy construction adapted to support the load to which the bearing is subjected. The upper part 12 of the housing may be of light construction, as it carries no load and serves merely to protect the bearing from dirt and to prevent the loss of oil by splashing. The lower part 11 of the housing is formed with a cylindrical supporting surface 13, or rather a semi-cylindrical surface. The semi-cylindrical stationary bearing ring 14 is adapted to be supported by surface 13. The central part of the outer periphery of ring 14 is formed as a spherical surface 15 which is struck on a slightly smaller radius than is cylindrical surface 13. Consequently, the ring 14 rests on the surface 13 chiefly at the bottom part of the ring and hence the latter is free to roll slightly on the cylindrical surface. The reason for this rolling will be explained later, and the rolling is limited by the shoulders 16 on the ring 14.

Supported by ring 14 is a plurality of bearing blocks 17. The outer faces of these blocks are provided with projections 18 which are off-center, that is to say, the projections are closer to one end of the block than they are to the other. Key members 19 cooperate with axially extending recesses in ring 14 and blocks 17 to prevent relative peripheral movement of the blocks with respect to the ring, while permitting the blocks to tilt on their projections 18. Inwardly extending radial projections 20 formed on either end of ring 14 retain blocks 17 against axial movement with respect to the ring.

The inner surface 21 of the blocks are spherically formed and cooperate with a rotatable bearing ring 22 having a spherical surface. Ring 22 is secured to the shaft 23, which is to be supported by the bearing, in any suitable manner, such as by being shrunk on to the shaft.

In order to prevent rotation of ring 14 within the bearing housing, springs 24 are positioned between the ends of the ring and the upper part 12 of the housing. These springs prevent appreciable rotation of the ring with respect to the housing, while allowing the ring to roll on the surface 13.

A member 25, the form of which is clearly shown in Fig. 1, is secured to shaft 23 for rotation therewith. Member 25 provides a channel 26 in which there is formed an annular layer of lubricant when the shaft rotates. Channel members 27 are secured to the end of each block remote from the projection 18 and extend to within the channel 26 formed in member 25. As the ring of lubricant is rotated with member 25, these channel members 27 scoop up the lubricant and conduct it to the spherical bearing surface.

End plates 28 are provided for substantially closing the housing around the shaft. These plates are formed with conical portions 29 which cooperate with conical flanges 30 secured to the shaft 23 to prevent the escape of lubricant along the shaft.

The operation of the bearing is as follows:

The bearing shown, is adapted to sustain a load on shaft 23 acting always in substantially the same direction, that is to say, downwardly. The shaft is adapted to be rotated in the direction of the arrow in Fig. 2. Should rotation in the opposite direction be desired, the bearing, of course, can be reversed in position. This load is transferred from the shaft to ring 22, to blocks 17, to ring 14 and thence to the lower part 11 of the bearing housing. Due to the off-center location of the projections 18, the blocks will tilt about these projections so that the ends of the blocks more remote from the projection will be spaced slightly from the bearing ring 22. This is the forward end of the block relative to the direction of rotation of the shaft. This spacing is very slight, but is sufficient to provide a wedge-shaped space between the bearing surface of the blocks and the ring in which wedge-shaped films of lubricant are formed and retained. These films carry the load and prevent direct metal-to-metal contact at the bearing surfaces.

As previously stated, the lubricant is supplied to the bearing surface by means of the members 27 which scoop the rotating ring of lubricant out of the channel 26 formed in member 25. The tendency of the blocks 17 to rotate with ring 22 is prevented by means of the key members 19, while at the same time these key members allow tilting of the blocks. Axial displacement of the blocks 17 with respect to the ring 14 is prevented by the projections 20 on the ring. Rotation of the ring 14 with respect to the bearing housing is prevented by springs 24.

Due to the spherical shape of the bearing surfaces of the ring 22 and blocks 17, the bearing is capable of sustaining axial thrust. At the same time, it is desirable to allow for a slight axial displacement of the bearing to take care of, for instance, expansion of the shaft due to heating. When an axial thrust is imposed on the shaft, it causes the ring 14 to roll on the surface 13, which results in a slight axial displacement of the center of the bearing. The shoulders 16 on the ring 14 limit this rolling movement, and hence limit the amount of axial displacement. The springs 24 do not prevent this rolling movement of the ring 14, as might a rigid abutment.

It will be noted that the projection 18 on the central block 17 is in the axial plane in which the load acts. Moreover, the blocks are arranged substantially symmetrically on either side of this plane.

In the manufacture of the blocks 17, a complete ring is machined to provide a spherical bearing surface and the ring is then cut up into the individual blocks. Due to the fact that in accordance with the present invention, blocks are only provided on one-half of the bearing, one ring will provide enough blocks for two bearings. Consequently, the cost of production is correspondingly reduced. Moreover, if blocks were provided around the upper part of the bearing, they would sustain no load but would contact the rotatable bearing ring and thus give rise to unnecessary friction.

While I have described one more or less specific embodiment of my invention, it is to be understood that this is for the purpose of illustration only and does not limit the scope of the invention, which is to be determined by the appended claims viewed in the light of the prior art.

What I claim is:

1. In a bearing for supporting a shaft which is subjected to a load acting always in substantially the same direction, a rotatable bearing ring having a spherical bearing surface secured to the shaft, a stationary bearing ring extending only part way around the shaft, a plurality of bearing blocks suitably supported by said stationary ring and having spherical bearing surfaces cooperating with the bearing surface of said rotatable ring, and a bearing housing having a cylindrical supporting surface, said stationary ring having an outer curved surface cooperating with said cylindrical surface whereby said stationary ring may have rolling movement with respect to said housing.

2. In a bearing for supporting a shaft which is subjected to a load acting always substantially in the same direction, a rotatable bearing ring having a spherical bearing surface secured to the shaft, a stationary bearing ring extending only part way around the shaft, a plurality of bearing blocks having inner spherical bearing surfaces cooperating with the bearing surfaces of said rotatable ring, a projection on the outer face of each block, said projections being located off-center of the blocks and cooperating with said stationary ring to tiltably support said blocks, one of said blocks being positioned with the projection thereon in line with the load applied to the shaft, and a bearing housing having a cylindrical supporting surface, said stationary ring having an outer curved surface cooperating with said cylindrical surface whereby said stationary ring may have rolling movement with respect to said housing.

3. In a bearing for supporting a shaft which is subjected to a load acting always in substantially the same direction, a rotatable bearing ring having a spherical bearing surface secured to the shaft, a stationary bearing ring extending only part way around the shaft, a series of bearing blocks tiltably supported by said stationary ring and having spherical bearing surfaces cooperating with the bearing surface of said rotatable ring, said blocks being arranged substantially symmetrically on either side of the axial plane in which the load acts, and a bearing housing having a cylindrical supporting surface, said stationary ring having an outer curved surface cooperating with said cylindrical surface whereby said stationary ring may have rolling movement with respect to said housing.

4. In a bearing for supporting a shaft which is subjected to a load acting always in substantially the same direction, a rotatable bearing ring having a spherical bearing surface secured to the shaft, a stationary bearing ring extending only part way around the shaft, a series of bearing blocks tiltably supported by said stationary ring and having spherical bearing surfaces cooperating with the bearing surface of said rotatable ring, the center block of said series being positioned so as to be intersected by the axial plane in which the load acts, and a bearing housing having a cylindrical supporting surface, said stationary ring having an outer curved surface cooperating with said cylindrical surface whereby said stationary ring may have rolling movement with respect to said housing.

5. In a bearing for supporting a shaft which is subjected to a load acting always in substantially the same direction, a rotatable bearing ring having a spherical bearing surface secured to the shaft, a stationary bearing ring extending only part way around the shaft, a plurality of bearing blocks tiltably supported by said stationary ring and having spherical bearing surfaces cooperating with the bearing surfaces of said rotatable ring, means for retaining said blocks against peripheral movement with respect to said stationary ring, and a bearing housing having a cylindrical supporting surface, said stationary ring having an outer curved surface cooperating with said cylindrical surface whereby said stationary ring may have rolling movement with respect to said housing.

6. In a bearing for supporting a shaft which is subjected to a load acting always in substantially the same direction, a rotatable bearing ring having a spherical bearing surface secured to the shaft, a stationary bearing ring extending only part way around the shaft, a plurality of bearing blocks tiltably supported by said stationary ring and having spherical bearing surfaces cooperating with the bearing surfaces of said rotatable ring, key members engaging recesses in said blocks and in said stationary ring for retaining said blocks against peripheral movement with respect to said stationary ring, and a bearing housing having a cylindrical supporting surface, said stationary ring having an outer curved surface cooperating with said cylindrical surface whereby said stationary ring may have rolling movement with respect to said housing.

7. In a bearing for supporting a shaft which is subjected to a load acting always in substantially the same direction, a rotatable bearing ring having a spherical bearing surface secured to the shaft, a stationary bearing ring extending only part way around the shaft, a plurality of bearing blocks tiltably supported by said stationary ring and having spherical bearing surfaces cooperating with the bearing surfaces of said rotatable ring, means for retaining said blocks against axial movement with respect to said stationary ring, and a bearing housing having a cylindrical supporting surface, said stationary ring having an outer curved surface cooperating with said cylindrical surface whereby said stationary ring may have rolling movement with respect to said housing.

8. In a bearing for supporting a shaft which is subjected to a load acting always in substantially the same direction, a rotatable bearing ring having a spherical bearing surface secured to the shaft, a stationary bearing ring extending only part way around the shaft, a plurality of bearing blocks tiltably supported by said stationary ring and having spherical bearing surfaces cooperating with the bearing surfaces of said rotatable ring, inwardly extending radial projections on said stationary ring for retaining said blocks against axial movement with respect to said stationary ring, and a bearing housing having a cylindrical supporting surface, said stationary ring having an outer curved surface cooperating with said cylindrical surface whereby said stationary ring may have rolling movement with respect to said housing.

9. In a bearing for supporting a shaft which is subjected to a load acting always in substantially the same direction, a rotatable bearing ring having a spherical bearing surface secured to the shaft, a stationary bearing ring extending only part way around the shaft, a plurality of bearing blocks tiltably supported by said stationary ring and having spherical bearing surfaces cooperating with the bearing surfaces of said rotatable ring, means for retaining said blocks against axial and peripheral movement with respect to said stationary ring, and a bearing housing having a cylindrical supporting surface, said stationary ring having an outer curved surface cooperating with said cylindrical surface whereby said stationary ring may have rolling movement with respect to said housing.

10. In a bearing for supporting a shaft, a rotatable bearing ring having a bearing surface secured to the shaft, a stationary bearing ring spaced from said rotatable ring, a plurality of bearing blocks tiltably supported by said stationary ring and having bearing surfaces cooperating with the bearing surface of said rotatable ring, a bearing housing forming a lubricant reservoir, a member secured to the shaft and arranged to dip into the lubricant in the reservoir, said member formed to provide a channel for retaining an annular ring of lubricant during rotation, and means for conveying lubricant from said channel to said bearing surfaces.

11. In a bearing for supporting a shaft which is subjected to a load acting always in substantially the same direction, a rotatable bearing ring having a spherical bearing surface secured to the shaft, a stationary bearing ring extending only part way around the shaft, a plurality of bearing blocks tiltably supported by said stationary ring and having spherical bearing surfaces cooperating with the bearing surface of said rotatable ring, a bearing housing forming a lubricant reservoir, a member secured to the shaft and arranged to dip into the lubricant in the reservoir, said member formed to provide a channel for retaining an annular ring of lubricant during rotation, and means for conveying lubricant from said channel to said bearing surfaces.

12. In a bearing for supporting a shaft, a rotatable bearing ring having a bearing surface secured to the shaft, a stationary bearing ring spaced from said rotatable ring, a plurality of bearing blocks tiltably supported by said stationary ring and having bearing surfaces cooperating with the bearing surface of said rotatable ring, a bearing housing forming a lubricant reservoir, a member secured to the shaft and arranged to dip into the lubricant in the reservoir, said member formed to provide a channel for retaining an annular ring of lubricant during rotation, and a member formed with a channel secured to each of said blocks and extending into the channel in the first mentioned member for conveying lubricant from said annular ring to said bearing surfaces.

13. In a bearing for supporting a shaft which is subjected to a load acting always in substantially the same direction, a rotatable bearing ring having a spherical bearing surface secured to the shaft, a stationary bearing ring extending only part way around the shaft, a plurality of bearing blocks tiltably supported by said stationary ring and having bearing surfaces cooperating with the bearing surface of said rotatable ring, a bearing housing forming a lubricant reservoir, a member secured to the shaft and arranged to dip into the lubricant in the reservoir, said member formed to provide a channel for retaining an annular ring of lubricant during rotation, and a member formed with a channel secured to each of said blocks and extending into the channel in the first mentioned member for conveying lubricant from said annular ring to said bearing surfaces.

14. In a bearing for supporting a shaft which is subjected to a load acting always in substantially the same direction, a rotatable bearing ring having a spherical bearing surface secured to the shaft, a stationary bearing ring extending only part way around the shaft, a plurality of bearing blocks tiltably supported by said stationary ring and having spherical bearing surfaces cooperating with the bearing surfaces of said rotatable ring, a bearing housing having a cylindrical supporting surface and forming a reservoir for lubricant, said stationary ring having an outer curved surface cooperating with said cylindrical surface whereby said stationary ring may have rolling movement with respect to said housing, means for limiting said rolling movement, a member secured to the shaft and arranged to dip into the lubricant in the reservoir, said member formed to provide a channel for retaining an annular ring of lubricant during rotation, and a member formed with a channel secured to each of said blocks and extending into the channel in the first mentioned member for conveying lubricant from said annular ring to said bearing surfaces.

15. In a bearing for supporting a shaft which is subjected to a load acting always in substantially the same direction, a rotatable bearing ring having a spherical bearing surface secured to the shaft, a stationary bearing ring extending only part way around the shaft, a plurality of bearing blocks tiltably supported by said stationary ring and having spherical bearing surfaces cooperating with the bearing surface of said rotatable ring, a bearing housing having a cylindrical supporting surface, said stationary ring having an outer curved surface cooperating with said cylindrical surface whereby said stationary ring may have rolling movement with respect to said housing, and means for restraining said stationary ring from peripheral movement with respect to said housing while permitting said rolling movement.

16. In a bearing for supporting a shaft which is subjected to a load acting always in substantially the same direction, a rotatable bearing ring having a spherical bearing surface secured to the shaft, a stationary bearing ring extending only part way around the shaft, a plurality of bearing blocks tiltably supported by said stationary ring and having spherical bearing surfaces cooperating with the bearing surface of said rotatable ring, a bearing housing having a cylindrical supporting surface, said stationary ring having an outer curved surface cooperating with said cylindrical surface whereby said stationary ring may have rolling movement with respect to said housing, and resilient means between the ends of said stationary ring and said housing for restraining said stationary ring from peripheral movement with respect to said housing while permitting said rolling movement.

AUGUST GUNNAR
    FERDINAND WALLGREN.